US010728105B2

(12) United States Patent
Rossi et al.

(10) Patent No.: US 10,728,105 B2
(45) Date of Patent: Jul. 28, 2020

(54) HIGHER-ORDER NETWORK EMBEDDING

(71) Applicant: Adobe Inc., San Jose, CA (US)

(72) Inventors: Ryan A. Rossi, Mountain View, CA (US); Eunyee Koh, San Jose, CA (US); Sungchul Kim, San Jose, CA (US); Anup Bandigadi Rao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 23 days.

(21) Appl. No.: 16/204,616

(22) Filed: Nov. 29, 2018

(65) Prior Publication Data

US 2020/0177466 A1   Jun. 4, 2020

(51) Int. Cl.
| | | |
|---|---|---|
| *H04L 12/24* | (2006.01) | |
| *G06F 16/901* | (2019.01) | |
| *G06N 20/00* | (2019.01) | |
| *H04L 29/06* | (2006.01) | |

(52) U.S. Cl.
CPC ........ *H04L 41/145* (2013.01); *G06F 16/9024* (2019.01); *G06N 20/00* (2019.01); *H04L 41/16* (2013.01); *H04L 41/22* (2013.01); *H04L 63/145* (2013.01); *H04L 63/1416* (2013.01)

(58) Field of Classification Search
CPC .......................... H04L 63/1416; H04L 63/145
See application file for complete search history.

(56) References Cited

U.S. PATENT DOCUMENTS

| | | | | |
|---|---|---|---|---|
| 4,479,196 A | * | 10/1984 | Ferrer ................... | G06F 16/288 |
| 5,845,049 A | * | 12/1998 | Wu ......................... | G16B 40/00 |
| | | | | 706/20 |
| 9,852,231 B1 | * | 12/2017 | Ravi .................... | G06F 16/9024 |
| 2004/0204925 A1 | * | 10/2004 | Alon ....................... | G16B 5/00 |
| | | | | 703/2 |
| 2007/0239694 A1 | * | 10/2007 | Singh ................. | G06F 16/9024 |

(Continued)

FOREIGN PATENT DOCUMENTS

WO    WO-2012150107 A1 * 11/2012 ........... H04L 41/145

OTHER PUBLICATIONS

Ahmed,"Edge Role Discovery via Higher-order Structures", Apr. 23, 2018, 12 pages.

(Continued)

*Primary Examiner* — Lashonda T Jacobs
(74) *Attorney, Agent, or Firm* — SBMC

(57) ABSTRACT

In implementations of higher-order network embedding, a computing device maintains interconnected data in the form of a graph that represents a network, the graph including nodes that each represent entities in the network and node associations that each represent edges between the nodes in the graph. The computing device includes a network embedding module that is implemented to determine a frequency of k-vertex motifs for each of the edges in the graph, and derive motif-based matrices from the frequency of each of the k-vertex motifs in the graph. The network embedding module is also implemented to determine a higher-order network embedding for each of the nodes in the graph from each of the motif-based matrices. The network embedding module can then concatenate the higher-order network embeddings into a matrix representation.

20 Claims, 6 Drawing Sheets

(56) References Cited

U.S. PATENT DOCUMENTS

| | | | | |
|---|---|---|---|---|
| 2009/0070679 | A1* | 3/2009 | Shen | G06Q 30/02 715/733 |
| 2010/0290480 | A1* | 11/2010 | Westphal | H04L 45/54 370/408 |
| 2011/0173189 | A1* | 7/2011 | Singh | G06F 16/9024 707/722 |
| 2017/0033976 | A1* | 2/2017 | Ahmed | H04L 41/0668 |
| 2017/0318033 | A1* | 11/2017 | Holland | H04W 12/1204 |
| 2018/0160281 | A1* | 6/2018 | Zweig | G06F 17/16 |
| 2019/0130264 | A1* | 5/2019 | Rossi | G06K 9/6232 |

OTHER PUBLICATIONS

Ahmed, "Efficient Graphlet Counting for Large Networks", 2015 IEEE International Conference on Data Mining, Nov. 2015, 10 pages.

Coa, "GraRep: Learning Graph Representations with Global Structural Information", Oct. 23, 2015, 10 pages.

Grover, "node2vec: Scalable Feature Learning for Networks", Jul. 3, 2016, 10 pages.

Perozzi, "DeepWalk: Online Learning of Social Representations", Jun. 27, 2014, 10 pages.

Przulj, "Biological network comparison using graphlet degree distribution", Jan. 2007, 7 pages.

Rossi, "Role Discovery in Networks", Nov. 3, 2016, 20 pages.

Rossi, "The Network Data Repository with Interactive Graph Analytics and Visualization", http://networkrepository.com/, Mar. 4, 2015, pp. 4292-4293.

Tang, "Leveraging social media networks for classification", Jan. 14, 2011, pp. 447-478.

Tang, "LINE: Large-scale Information Network Embedding", Mar. 12, 2015, 11 pages.

Yu, "Scalable Coordinate Descent Approaches to Parallel Matrix Factorization for Recommender Systems", In IEEE International Conference of Data Mining, Dec. 2012, 10 pages.

* cited by examiner

HIGHER-ORDER NETWORK EMBEDDING

BACKGROUND

Generally, relational data in graph form can be used to represent networks in many different types of domains, such as Internet-related networks, in the fields of science and research collaboration, in epidemiology related to the study of patterns and causes of health conditions, communication analysis between members and groups in social networks, advertising and marketing analytics, in the study of ecosystems, power grid dynamics, and many others. The network entities in many of these types of complex networks are represented as nodes in a graph. Generally, the links or connections between the network entities may be represented as any form of citations, collaborations, associations, functions, communications, co-locations, shared mechanisms, or many other explicit or implicit relationships. Further, graphs that represent networks can be derived from most any type of data, including non-relational types of data, images data, or other types of traditional data. Generally, the graphs can be derived by computing a similarity (or more generally a function) between every two data points in a graph that captures whether the two data points should be linked in the graph or not.

Notably, the success of many graph-based machine learning tasks depend on an appropriate representation of a complex network, as determined from the graph data, such as for modeling user behavior, detecting unusual user activity (anomaly detection), and entity resolution (network alignment). Conventional techniques typically rely on learning the features of graph nodes simply based on how close the nodes are to one another in the graph, such as determined from a simple adjacency matrix of the graph. For instance, the conventional techniques may incorrectly represent nodes as being similar, despite the nodes having fundamentally different connectivity patterns in the graph, and the conventional techniques are unable to determine the connectivity patterns among the nodes and links in a graph that represents a complex network.

SUMMARY

This Summary introduces features and concepts of higher-order network embedding, which is further described below in the Detailed Description and shown in the Figures. This Summary should not be considered to describe essential features of the claimed subject matter, nor used to determine or limit the scope of the claimed subject matter.

Aspects of higher-order network embedding are described. In implementations, a computing device can receive and maintain interconnected data in the form of a graph that represents a network with network motifs, also referred to as "graphlets" or "induced subgraphs," and are the network motifs of interest in the graph. The graph can be representative of a complex or dynamic network, such as a social network, tech-based network, web-based network, or any other type of network data graph that can include a variety of subgraphs, where the network motifs are recurrent and statistically significant subgraphs or patterns in the graph. The graph includes nodes that each represent an entity in the network and node associations that each represent an edge between two of the nodes in the graph. As noted, the graph may represent a social network that develops as members of the social network interact with each other, such as via messages over a communication network, and the node associations each represent an interaction between two of the members of the social network. In another example, the graph may represent any type of complex or dynamic network that evolves with the addition, deletion, and updates of various network entities and associations.

The computing device implements a network embedding module that can determine a frequency of k-vertex motifs for each of the edges in the graph, such as by counting the frequency of the k-vertex motifs in the graph. Generally, a connected graph is k-vertex-connected if it has more than k vertices and remains connected whenever fewer than k vertices are removed. The vertex-connectivity of a graph is the largest k for which the graph is k-vertex-connected, and given any number of the nodes in the graph, there is a finite number of possible edge sets between them and these can be enumerated and counted in any given graph.

The network embedding module is also implemented by the computing device to derive motif-based matrices from the frequency of each of the k-vertex motifs in the graph. In implementations, the motif-based matrices that are derived from the frequency of the k-vertex motifs are weighted motif graphs. The motif-based matrices may be derived using a k-step linear operator for linear attribute diffusion without explicit construction of the motif-based matrices. Alternatively, the motif-based matrices may be derived using normalized motif Laplacian attribute diffusion to diffuse attributes that are incorporated into the higher-order network embeddings.

The network embedding module may also receive an input parameter that designates a number of steps used to derive the k-step motif-based matrices from the frequency of each of the k-vertex motifs in the graph. The network embedding module can then determine a higher-order network embedding for each of the nodes in the graph from each of the motif-based matrices. Notably, the determined "embeddings" of the nodes in the graph may also be referred to as "features", "representations", or "encodings." The network embedding module can then concatenate the higher-order network embeddings into a matrix representation, as well as determine a joint higher-order network embedding from the matrix, where the joint higher-order network embedding represents subgraph patterns of subgraphs of the network.

In aspects of the higher-order network embedding, the network embedding module is also implemented to determine a motif matrix function that represents a mapping of the nodes to d-dimensional features represented by the higher-order network embeddings. As noted above, a higher-order network embedding of a node in the graph may also be referred to as a features, representation, or encoding of the node in the graph. In implementations, the network embedding module can determine a network representation from machine learning applied to the higher-order network embeddings. Further, a network model of a network can be generated based on the higher-order network embeddings of the nodes in the graph, and the network model is then usable to model roles of the entities in the network. For example, a recommendation system can utilize the network model to model the behavior roles of the entities in the network based on dependencies and connectivity patterns among the nodes in the graph that represents the network.

BRIEF DESCRIPTION OF THE DRAWINGS

Implementations of higher-order network embedding are described with reference to the following Figures. The same numbers may be used throughout to reference similar features and components that are shown in the Figures.

DETAILED DESCRIPTION

Figure 1:
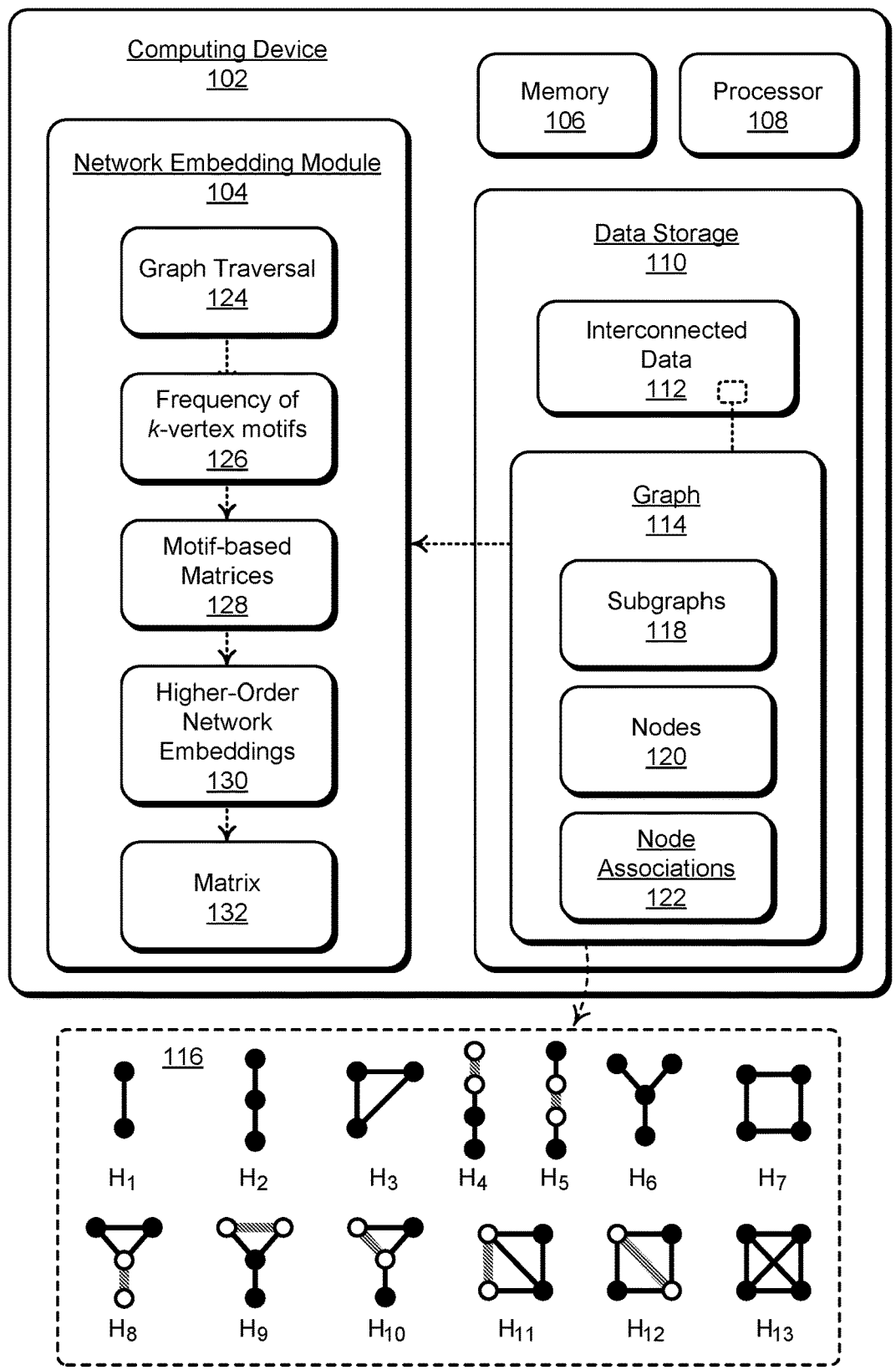
FIG. 1 illustrates an example environment in which aspects of higher-order network embedding can be implemented.

Implementations of higher-order network embedding are described, and provide a system for learning higher-order network embeddings of entities represented as nodes in a graph based on subgraph patterns, which are also referred to as network motifs or graphlets. A graph can be used to represent any type of network and relational data, such as an Internet-related network, a science and research-based network, an epidemiology-related network, for communication analysis between members and groups in social networks, for advertising and marketing analytics, in the study of ecosystems, for power grid dynamics, and for many other types of complex or dynamic networks. The node associations between the nodes of a graph can represent any form of node association, such as citations, collaborations, associations, functions, communications, co-locations, shared mechanisms, explicit or implicit relationships, and any other type of node association. Generally, a graph can represent the overall flow of information in a complex or dynamic network, and the higher-order network embeddings are determined as the features of the network nodes that represent and describe the network entities. As described herein, the higher-order network embeddings may be used or referred to interchangeably with the terms features, representations, and/or encodings as pertaining to the network nodes.

The success of many graph-based machine learning tasks depend on an appropriate representation of a complex network, as determined from the graph data, such as for modeling user behavior, detecting unusual user activity (anomaly detection), entity resolution (network alignment), and more generally, node classification, among other applications. The techniques for higher-order network embedding are described herein as a general computational framework for deriving node (e.g., network entity) embeddings based on subgraph patterns (e.g., network motifs) that capture higher-order connectivity patterns and structural similarity between the nodes of a graph. The higher-order network embeddings may then be used for modeling user behavior, entity resolution, and other graph-based machine learning tasks that depend on an appropriate representation of a complex network. In implementations, the described techniques leverage available network motif counts, and more generally statistics of the graph, by deriving a weighted motif graph (e.g., a motif-based adjacency matrix) from each network motif, and uses these to learn the higher-order graph embeddings that capture the notion of structural similarity in a network.

A network model of a network can be generated based on the learned higher-order network embeddings of the nodes in a graph that represents the network, and the network model is usable by a recommendation system, for example, to model the roles (e.g., behavior roles) of the entities in the network. For instance, in recommendation systems with users who are associated to other entities (e.g., items, events, pages, groups, users, locations, restaurants, businesses, etc.) that are being recommended, the users (nodes) are linked (associated) to the entities, which can be modeled by the network embedding module described herein, thus significantly improving prediction analytics. In a network, "roles" of the network entities represent edge connectivity patterns, such as hub/star-center nodes, star-edge nodes, near-cliques, and/or bridge nodes connecting different regions of the graph. Intuitively, two nodes belong to the same role if they are structurally similar with respect to their general connectivity and subgraph patterns. Generally, the roles are sets of nodes that are more structurally similar to nodes inside a set than outside, whereas communities are sets of nodes with more connections inside the set than outside. Roles are complimentary, but fundamentally different to the notion of communities, which represent cohesive, tightly-knit groups of nodes, and nodes in the same community are close together (e.g., at a small graph distance), whereas roles represent nodes that are structurally similar with respect to their general connectivity and subgraph patterns, and are independent of the distance and/or proximity to one another in the graph. Hence, two nodes that share similar roles can be in different communities and even in two disconnected components of the graph. Notably, the goal of role learning in graphs is to not only group structurally similar nodes into sets, but also to embed them close together in some d-dimensional space.

As noted above, conventional network representation learning techniques typically rely on learning the features of graph nodes simply based on how close the nodes are to one another in the graph, such as determined from a simple adjacency matrix of the graph. The conventional techniques attempt to determine the roles (e.g., the structural similarity) using random walks that are fundamentally tied to node identity, and not the general structural and subgraph patterns (e.g., the network motifs) of the nodes. The conventional techniques may incorrectly represent nodes as being similar, despite the nodes having fundamentally different connectivity patterns in the graph. As such, two nodes with similar embeddings will be near one another in the graph since they appear near one another in a random walk. However, the conventional techniques are insufficient to determine roles of the network entities, as they fail to capture the general higher-order connectivity patterns of the nodes. Moreover, past approaches that leverage traditional random walks, such as by using node identifiers as opposed to attributed random walks that use "types", capture communities in the graph as opposed to node roles, which are independent of the distance and/or proximity of the nodes, and instead represent higher-order connectivity patterns such as nodes that represent hubs or near-cliques. For instance, instead of representing hub nodes (e.g., large star-centers) in a similar fashion, the previous techniques using explicit random-walks based on proximity and/or distance-based would represent a hub node (e.g., a star center) and its neighbors (e.g., the star-edges) similarly, despite them having fundamentally different connectivity patterns.

Additionally, the techniques for higher-order network embedding (HONE) described herein include diffusion-based HONE variants that leverage a general diffusion mechanism to improve predictive performance. In implementations, the local k-step motif embeddings can be derived without explicitly constructing the k-step motif matrices, (as these can often densify quickly as k increases). That is to say, the general diffusion mechanism can be implemented along with a space-efficient approach that avoids explicit construction of the k-step motif-based matrices using a k-step linear operator. Notably, a computing device can receive and maintain interconnected data in the form of a graph that represents a network with network motifs. The computing device implements a network embedding module that can determine a frequency of k-vertex motifs for each of the edges in the graph, such as by counting the frequency of the k-vertex motifs in the graph.

The network embedding module is also implemented by the computing device to derive motif-based matrices from the frequency of each of the k-vertex motifs in the graph. In implementations, the motif-based matrices that are derived from the frequency of the k-vertex motifs are weighted motif graphs. The motif-based matrices may be derived using a k-step linear operator for linear attribute diffusion without explicit construction of the motif-based matrices. Alternatively, the motif-based matrices may be derived using normalized motif Laplacian attribute diffusion to diffuse attributes that are incorporated into the higher-order network embeddings.

The network embedding module may also receive an input parameter that designates a number of steps used to derive the k-step motif-based matrices from the frequency of each of the k-vertex motifs. The network embedding module can also determine a higher-order network embedding for each of the nodes in the graph from each of the motif-based matrices. The network embedding module can then concatenate the higher-order network embeddings into a matrix representation, as well as determine a joint higher-order network embedding from the matrix, where the joint higher-order network embedding represents subgraph patterns of subgraphs of the network.

As described herein, a "higher-order network embedding" of a node in a graph is determined as the features or encodings that represent and/or describe the network entity represented by the node in the graph. The higher-order network embeddings may be used or referred to interchangeably with the terms features, representations, and/or encodings as pertaining to the nodes of a graph. The higher-order network embeddings can be used for modeling user behavior, entity resolution, and other graph-based machine learning tasks that depend on an appropriate representation of a complex network.

An "entity" of a network may be any type of object, user, device, unit, or other type of subject in a network. For example, entities may be the members of a social network who communicate with each other. Similarly, the entities of the social network may be the devices of the users that interact to send and receive the communications. In other examples, an entity may be the subject of any type of network, such as biological, genetic, medical, neural, science, research, communication, marketing, analytic, web-based, or any other types of complex networks.

The "node(s)" of a graph each represent an entity of a network. As noted above, an entity may be the subject of any type of network, and a node of a graph represents an entity of the network, which is represented by the graph. Notably, relational data in graph form can be used to represent any type of network, and the network entities of the network are each represented as a node in the graph.

The "edge(s)" of a graph each represent a connection or relationship between the nodes in the graph, referred to herein as the node associations that each represent an edge between two of the nodes in the graph. Generally, the links or connections between the network entities, which are the nodes in the graph, may be represented as any form of citations, collaborations, associations, functions, communications, co-locations, shared mechanisms, or many other explicit or implicit relationships.

Given the nodes of a graph that each represent an entity of a network, and the edges of the graph that each represent a node association between two of the nodes in the graph, the term "interconnected data" describes the overall graph data that is the graph, which represents the network with network motifs. The graph data can represent a correlation of user devices, device locations (spatial information), device connections, the time of an associated event, IP connections, webpages visited, among any other characteristics reflective of the many types of networks referred to above, such as biological, genetic, medical, neural, science, research, communication, marketing, analytic, web-based, or any other types of complex networks.

The term "network motifs" used herein generally refers to the building blocks of a complex network, where the motifs of a network represent the structure and function of the complex network. Network motifs are also generally referred to as "graphlets", "orbits", or "induced subgraphs" of a graph, and a network motif can encompass more than one node and the corresponding node associations. A network motif is the patterns of interconnections occurring in a complex network at numbers that are significantly higher than those in randomized networks. Given any number of nodes in a graph, there is a finite number of possible edge sets between them and these can be enumerated and counted in any given graph.

Given the network motifs described above, the "k-vertex motifs" can be network motifs of size k (e.g., 3, 4, and 5) vertices as the base features for graph representation learning using higher-order network motifs based on small k-vertex subgraph patterns (e.g., graphlets) of a graph that represents a complex network. Notably, the term motif is used generally and can refer to graphlets of a graph denoted as $G=(V, E)$, where a graphlet $H_i=(V_k, E_k)$ is an induced subgraph consisting of a subset $V_k \cup V$ of k vertices from $G=(V, E)$ together with all edges whose endpoints are both in this subset.

As used herein, a "motif-based matrix" refers to any motif matrix S as derived from a function $\Psi(W)$, where higher-order network embedding determinations can be generalized for any motif-based matrix formulation. The function $\Psi$ is defined as $\Psi: \mathbb{R}^{N \times N} \to \mathbb{R}^{N \times N}$ over a weighted motif adjacency matrix $W_t \in W$, and using the function $\Psi$, the following motif matrix is derived as: $S_t = \Psi(W_t)$, for $(t=1, 2, \ldots, T)$. Notably, the motif-based matrices are derived from the frequency of each of the k-vertex motifs occurring in a graph, as described above.

While features and concepts of higher-order network embedding can be implemented in any number of different devices, systems, networks, environments, and/or configurations, implementations of the higher-order network embedding are described in the context of the following example devices, systems, and methods.

FIG. 1 illustrates an example environment 100 in which aspects of higher-order network embedding can be implemented. The example environment 100 includes a computing device 102, which implements features of a network embedding module 104 to determine higher-order network embeddings of a network that includes network motifs. The computing device 102 can be implemented as any type of computing device, client device, mobile phone, tablet device, communication, entertainment, gaming, media playback, and/or other type of electronic and/or computing device. In this example environment 100, the computing device 102 may include any number and combination of different components as further described with reference to the example device shown in FIG. 6. For example, the computing device 102 in this example includes memory 106 and a processor 108, as well as any type of data storage 110 that may be implemented as any suitable memory, memory device, or electronic data storage.

The computing device 102 implements the network embedding module 104, such as in software, in hardware, or as a combination of software and hardware components. In this example, the network embedding module 104 is implemented as a software application or modules, such as executable software instructions (e.g., computer-executable instructions) that are executable with a processing system (e.g., the processor 108) of the computing device 102 to implement the techniques of higher-order network embedding. The network embedding module 104 can be stored on computer-readable storage media, such as any suitable memory device (e.g., the device memory 106) or electronic data storage implemented in the computing device 102.

In this example, the data storage 110 maintains interconnected data 112 in the form of a graph 114 that represents a network that includes network motifs 116. The graph 114 can be representative of any type of network, such as a social network, tech-based network, web-based network, or any other type of network represented by a graph that can include a variety of subgraphs 118, where the network motifs 116 are recurrent and statistically significant subgraphs or patterns in the graph. Generally, a subgraph 118 of the graph 114 is another graph formed from a subset of the vertices and edges (e.g., nodes and node associations) of the graph. A vertex subset includes all of the endpoints of an edge subset, and may also include additional vertices. The network motifs 116 are subgraphs that repeat themselves in the network or among various networks. Each of the subgraphs 118, as defined by a particular pattern of interactions between the nodes 120, can reflect a framework that represents dependencies and connectivity patterns among the nodes 120 and the node associations 122.

The graph 114 includes the nodes 120 that each represent an entity in the network, and includes the node associations 122 that each represent an edge between two of the nodes 120 in the graph. In implementations, a node association 122 may be based at least in part on a temporal value that indicates the time when the two nodes were associated. As noted above, the graph may represent a social network that develops as members of the social network interact with each other, such as via messages over a communication network, and the node associations each represent an interaction between two of the members of the social network. In another example, the graph may represent any type of network that evolves with the addition, deletion, and updates of various network entities and associations.

The computing device 102 implements the network embedding module 104 for graph traversal 124 and to determine a frequency of k-vertex motifs 126 for each of the edges in the graph 114. In implementations, the network embedding module 104 is implemented to count the frequency of the k-vertex motifs 126 in the graph, which includes counting the frequency of each k-vertex motif, graphlet, or induced subgraph of interest (for k=2, . . . ) for every edge (i, j) in the graph. Notably, a node association between two nodes in the graph is an edge (e.g., a pair of nodes i and j) and the motifs, graphlets, or induced subgraphs that occur on every edge in the graph are counted. Further in general, any set of network motifs can be used, such as all k-vertex motifs, or all k-vertex motifs and (k−1)-vertex motifs, etc. Generally, a connected graph is k-vertex-connected if it has more than k vertices and remains connected whenever fewer than k vertices are removed. The vertex-connectivity of a graph is the largest k for which the graph is k-vertex-connected, and given any number of the nodes in the graph, there is a finite number of possible edge sets between them and these can be enumerated and counted in any given graph.

The network embedding module 104 is also implemented by the computing device to derive motif-based matrices 128 from the frequency of each of the k-vertex motifs 126 in the graph 114. In implementations, the motif-based matrices 128 that are derived from the frequency of the k-vertex motifs 126 are weighted motif graphs. The motif-based matrices 128 may be derived by the network embedding module 104 using a k-step linear operator for linear attribute diffusion without explicit construction of the motif-based matrices. Alternatively, the motif-based matrices 128 may be derived using normalized motif Laplacian attribute diffusion to diffuse attributes that are incorporated into the higher-order network embeddings 130.

The network embedding module 104 may also receive an input parameter that designates a number of steps used to derive the k-step motif-based matrices from the frequency of each of the k-vertex motifs 126. The network embedding module 104 can then determine the higher-order network embedding 130 for each of the nodes 120 in the graph 114 from each of the motif-based matrices 128. The network embedding module 104 can then concatenate the higher-order network embeddings 130 into a matrix 132 representation. The network embedding module 104 may also be implemented to determine a joint higher-order network embedding from the matrix 132, where the joint higher-order network embedding represents subgraph patterns of the subgraphs 118 of the network.

In aspects of the higher-order network embedding, the network embedding module 104 is implemented to determine a motif matrix function that represents a mapping of the nodes 120 to d-dimensional features represented by the higher-order network embeddings 130. The network embedding module 104 can determine a network representation from machine learning applied to the higher-order network embeddings as further shown and described with reference to FIG. 3.

Generally, higher-order network embedding is described in the context of the network (e.g., represented by the graph 114) G=(V, E), and a set of network motifs 'H₁={H₁, . . . , H_T}, where the goal of higher-order network embedding (HONE) is to learn the function $f:V \to \mathbb{R}^D$ that maps the nodes 120 to d-dimensional embeddings using the network motifs 'H. The particular family of higher-order network embeddings is based on learning the function $f:V \to \mathbb{R}^D$ that maps the nodes 120 to the d-dimensional embeddings using (powers of) weighted motif graphs derived from a motif matrix function Ψ. Notably, other families of higher-order network embedding methods can exist in the class of higher-order network embeddings.

Network Motifs: In aspects of higher-order network embedding, the framework can use graphlets or orbits, where the term network motifs 116 is used generally to refer to graphlets or orbits (also referred to as graphlet automorphisms). Notably, a graphlet $H_t=(V_k, E_k)$ is an induced subgraph consisting of a subset $V_k \cup V$ of k vertices from $G=(V, E)$ together with all edges whose endpoints are both in this subset $E_k=\{\forall e \in E | e=(u,v) \wedge u, v \in V_k\}$. Alternatively, the nodes of every graphlet can be partitioned into a set of automorphism groups called orbits. The network embedding module 104 can take into account the position of an edge in a graphlet, such as an edge in a 4-node path of a network motif 116 that has two different unique positions, namely, the edge in the center of the path, or an edge on the outside of the 4-node path. Each unique edge position in a graphlet is referred to as an automorphism orbit, or just orbit. More formally, an automorphism of a k-vertex graphlet $H_t=(V_k, E_k)$ is defined as a permutation of the nodes in $H_t$ that preserves edges and non-edges. The automorphisms of $H_t$ form an automorphism group denoted as $\text{Aut}(H_t)$. A set of nodes $V_k$ of graphlet $H_t$ define an orbit iff (i) for any node $u \in V_k$ and any automorphism $\pi$ of $H_t$, $u \in V_k \Longleftrightarrow \pi(u) \in V_k$; and (ii) if v, $u \in V_k$ then there exists an automorphism $\pi$ of $H_t$ and a $\gamma>0$ such that $\pi^\gamma(u)=v$. In this example, all of the (2-4)-vertex connected edge orbits are used and denoted as the set 'H of the network motifs 116.

Weighted Motif Graphs: As noted above, the motif-based matrices 128 that are derived from the frequency of a k-vertex motifs 126 are weighted motif graphs. Given a network graph $G=(V, E)$ with $N=|V|$ nodes, $M=|E|$ edges, and a set $'H=\{H_1, \ldots, H_T\}$ of T network motifs, the network embedding module 104 can form the weighted motif adjacency matrices: $W=\{W_1, W_2, \ldots, W_T\}$ where $(W_t)_{ij}$=the number of occurrences of motif $H_t \in 'H$ that contain $(i,j) \in E$. The weighted motif graphs (e.g., the motif-based matrices 128) differ from the original graph 114 in two aspects. First, the edges in each motif graph is likely to be weighted differently, as each network motif can appear at a different frequency than another arbitrary motif for a given edge. The edge motif weights when combined with the structure of the graph reveal important structural properties with respect to the weighted motif graph. Second, the motif graphs are often structurally different, For example, if edge $(i,j) \in E$ exists in the original graph G, but $(W_t)_{ij}=0$ for some arbitrary motif lit, then $(i, j) \notin E_t$. Hence, the motif graphs encode relationships between the nodes 120 that have a sufficient number of motifs. To generalize the above weighted motif graph formulation, the edge constraint that represents an edge exists between i and j is replaced if the number of instances of motif $H_t \in 'H$ that contain nodes i and j is 1 or larger, by enforcing an edge constraint that requires each edge to have at least $\delta$ motifs. In other words, different motif graphs can arise using the same motif $H_t$ by enforcing an edge constraint that requires each edge to have at least $\delta$ motifs.

Motif Matrix Functions: To generalize higher-order network embedding for any motif-based matrix formulation, the function $\Psi$ is defined as $\Psi: \mathbb{R}^{N \times N} \to \mathbb{R}^{N \times N}$ over a weighted motif adjacency matrix $W_t \in W$. Using the function $\Psi$, the following EQ1 is derived as: $S_t=\Psi(W_t)$, for (t=1, 2, \ldots, T) where the term motif-based matrix refers to any motif matrix S derived from $\Psi(W)$. Some motif matrix functions $\Psi$ summarized below include weighted motif graph, weighted motif transition matrix, weighted motif Laplacian, normalized weighted motif Laplacian, and random walk normalized weighted motif Laplacian.

Weighted Motif Graph: Given a graph G and a network motif $H_t \in 'H$, $W_t$ is formed where $H_t:(W_t)_{ij}$=a number of instances of $H_t$ that contain nodes i and j. In the case of using HONE directly with a weighted motif adjacency matrix W, then as in the following EQ2: $\Psi: W \to IW$, the number of paths weighted by motif counts from node i to node j in k-steps is given by EQ3:

$$(W^k)_{ij} = \left(\underbrace{W \ldots W}_{k}\right)_{ij}$$

Weighted Motif Transition Matrix: The random walk on a graph W weighted by motif counts has transition probabilities as in the following EQ4:

$$P_{ij} = \frac{W_{ij}}{w_i}$$

where $w_i=\Sigma_j W_{ij}$ is the motif degree of node i. The random walk motif transition matrix P for an arbitrary weighted motif graph W is defined as in EQ5:

$$P=D^{-1}W$$

where $D=\text{diag}(We)=\text{diag}(w_1, w_2, \ldots, w_N)$ is a N×N diagonal matrix with the motif degree $w_i=\Sigma_j W_{ij}$ of each node on the diagonal called the diagonal motif degree matrix and $e=[1\ 1\ \ldots\ 1]^T$ is the vector of all ones. P is a row-stochastic matrix with $\Sigma_j P_{ij}=p_i^T e=1$ where $p_i \in \mathbb{R}^N$ is a column vector corresponding to the i-th row of P. For directed graphs, the motif out-degree is used, however the motif in-degree or total motif degree (among other quantities) can also be leveraged. The motif transition matrix P represents the transition probabilities of a non-uniform random walk on the graph that selects subsequent nodes with probability proportional to the connecting edge's motif count. Therefore, the probability of transitioning from node i to node j depends on the motif degree of j relative to the total sum of motif degrees of all neighbors of i. The probability of transitioning from node i to j in k-steps is given by EQ6:

$$(P^k)_{ij} = \left(\underbrace{P \ldots P}_{k}\right)_{ij}$$

Weighted Motif Laplacian: The motif Laplacian for a weighted motif graph W is defined as in EQ7: $L=D-W$, where $D=\text{diag}(We)$ is the diagonal motif degree matrix defined as $D_{ii}=\Sigma_j W_{ij}$. For directed graphs, either the in-motif degree or the out-motif degree can be used.

Normalized Weighted Motif Laplacian: Given a graph W weighted by the counts of an arbitrary network motif $H_t \in 'H$, the normalized motif Laplacian is defined as in EQ8:

$$\hat{L}=I-D^{-1/2}WD^{-1/2}$$

where I is the identity matrix and $D=\text{diag}(We)$ is the N×N diagonal matrix of motif degrees. In other words, as in the following EQ9:

$$\hat{L}_{ij} = \begin{cases} 1 - \frac{W_{ij}}{w_j} & \text{of } i = j \text{ and } w_j \neq 0 \\ -\frac{W_{ij}}{\sqrt{w_i w_j}} & \text{if } i \text{ and } j \text{ are adjacent} \\ 0 & \text{otherwise} \end{cases}$$

where $w_i=\Sigma_j W_{ij}$ is the motif degree of node i.

Random Walk Normalized Weighted Motif Laplacian: Formally, the random walk normalized motif Laplacian is as in EQ10:

$$\hat{L}_{rw} = I - D^{-1}W$$

where I is the identity matrix, D is the motif degree diagonal matrix with $D_{ii} = w_i$, $\forall_i = 1, \ldots, N$, and W is the weighted motif adjacency matrix for an arbitrary motif $H_t \in H$. Notably, $\hat{L}_{rw} = I - P$ where $P = D^{-1}W$ is the motif transition matrix of a random walker on the weighted motif graph. All of the variants are easily formulated as functions $\Psi$ in terms of an arbitrary motif weighted graph W.

Local K-Step Motif-based Embeddings: The local higher-order network embeddings learned for each network motif $H_t \in H$ and k-step where $k \in \{1, \ldots, K\}$ are described. The term local refers to the fact that node embeddings are learned for each individual motif and k-step independently. The k-step motif-based matrices for all T motifs and K steps are defined as in EQ11:

$$S_t^{(k)} = \Psi(W_t^k) \text{ for } k=1, \ldots, K \text{ and } t=1, \ldots, T$$

where as in EQ12:

$$\Psi(W_t^k) = \frac{(W_t \ldots W_t)}{k}$$

These k-step motif-based matrices can densify quickly and therefore the space required to store the k-step motif-based matrices can grow fast as K increases. For large graphs, it is often impractical to store the k-step motif-based matrices for any reasonable K. To overcome this issue, can explicitly avoid constructing the k-step motif-based matrices entirely. Hence, no additional space is required and the actual k-step motif-based matrices for k>1 don't need to be stored. This is discussed for any k-step motif-based matrix below in this subsection.

Given a k-step motif-based matrix $S_t^{(k)}$ for an arbitrary network motif $H_t \in H$, an embedding is determined by solving an optimization problem as in the following EQ13:

$$\underset{U_t^{(k)}, V_t^{(k)} \in C}{\text{argmin}} \mathbb{D}(S_t^{(k)} \| \Phi\langle U_t^{(k)} V_t^{(k)} \rangle), \forall_k = 1, \ldots, K \text{ and } t = 1, \ldots, T$$

where $\mathbb{D}$ is a generalized Bregman divergence (and quantifies≈in the HONE embedding model $S_t^{(k)} \approx \Phi\langle U_t^{(k)} V_t^{(k)} \rangle$) with matching linear or non-linear function $\Phi$ and C is constraints (e.g., nonnegativity constraints U≥0, V≥0, orthogonality constraints $U^T U = I$, $V^T V = I$). The above optimization problem finds low-rank embedding matrices $U_t^{(k)}$ and $V_t^{(k)}$ such that $S_t^{(k)} \approx \Phi\langle U_t^{(k)} V_t^{(k)} \rangle$. The function $\Phi$ allows non-linear relationships between $U_t^{(k)}$, $V_t^{(k)}$, and $S_t^{(k)}$. Different choices of $\Phi$ and $\mathbb{D}$ yield different HONE embedding models and depend on the distributional assumptions on $S_t^{(k)}$. For instance, minimizing squared loss with an identity link function $\Phi$ yields singular value decomposition corresponding to a Gaussian error model. Other choices of $\Phi$ and $\mathbb{D}$ yield other HONE embedding models with different error models including Poisson, Gamma, or Bernoulli distributions.

As noted above, explicitly computing and storing the k-step motif-based matrices from EQ11 can be avoided because they can densify quickly as K increases and therefore are impractical to store for any large graph and reasonable K. This is accomplished by defining a linear operator corresponding to the K-step motif-based matrices that can run in at most K times the linear operator corresponding to the (1-step) motif-based matrix. In particular, many algorithms used to compute low-rank approximations of large sparse matrices do not need access to the explicit matrix, but only the linear operator corresponding to action of the input matrix on vectors. For a matrix A, let $T_A$ denote the upper bound on the time required to compute Ax for any vector x, and note $T_A = \overline{O}(M)$ where M=nnz(A) always holds and is a useful bound when A is sparse. Therefore, the time required to compute a rank-$D_l$ approximation of A is $\overline{O}(T_A D_l \log N + ND_l^2 \log N)$ where N=|V|.

A linear operator can now be defined corresponding to the K-step motif-based matrices that can run in at most K times the linear operator corresponding to the (1-step) motif-based matrix. This can be shown for the case of any weighted motif adjacency matrix W. Let $T_W$ be the time required to compute Wx, for any vector x, then to compute $W^K x$, let $x_0 \leftarrow x$ and iteratively compute $x_i = W x_{i-1}$ for i=1, ..., K. This shows that $T_{W^K} = \overline{O}(KTw)$ and implies computing a rank-$D_l$ embedding of the K-step motif adjacency matrix in time at most $\overline{O}(KT_W D_l \log N + ND_l^2 \log N)$ which is at most as in EQ14:

$$\overline{O}(KMD_l \log N + ND_l^2 \log N)$$

where M=nnz(W). This implies that the time to compute the rank-$D_l$ embedding grows only linearly with K, and therefore, no additional space is required and the actual k-step motif-based matrices for k>1 do not need to be derived and stored. Moreover, as shown above, the time complexity grows linearly with K and is therefore efficient. The time complexity in the above EQ14 is for singular value decomposition/eigen-decomposition and hence finds the best rank-$D_l$ approximation. However, linear operators can also be defined for other optimization techniques that can be used to compute a rank-$D_l$ approximation such as stochastic gradient descent, block/cyclic coordinate descent, or alternating least squares. Thus, the time complexity for computing rank-$D_l$ embeddings using these optimization techniques will also only increase by a factor of K.

Afterwards, the columns of $U_t^{(k)}$ are normalized by a function $g: \mathbb{R}^{N \times N} \to \mathbb{R}^{N \times N}$ as follows in EQ15: $U_t^{(k)} \leftarrow g(U_t^{(k)})$, for t=1, ..., T and k=1, ..., K. In this example, g is a function that normalizes each column of $U_t^{(k)}$ using the Euclidean norm. The HONE framework is flexible for use with other norms as well and the appropriate norm should be chosen based on the data characteristics and application.

Learning Global Higher-Order Embeddings: A higher-order embedding for an arbitrary graph G that automatically captures the important motifs is learned, where simply concatenating the previous motif embeddings into a single matrix and using this for prediction assumes that each motif is equally important. Notably, however, some motifs are more important than others and the choice depends on the graph structure and its properties. Therefore, instead of assuming all motifs contribute equally to the embedding, a global higher-order embedding is determined that automatically captures the important motifs in the embedding without requiring an expert (e.g., a user) to hand select the most important motifs to use. This effectively allows the overall model to learn a combination of latent features using the local motif-based embeddings from different network motifs and from different steps (motif graph scales).

For this, the k-step embedding matrices for all T motifs and all K steps are concatenated as in the following EQ16:

$$Y = [\underbrace{U_1^{(1)} \ldots U_T^{(1)}}_{1-step} \ldots \underbrace{U_1^{(K)} \ldots U_T^{(K)}}_{K-steps}]$$

where Y is a N×TKD$_l$ matrix. Note that at this stage, Y could simply be output as the final motif-based node embeddings and used for a downstream prediction task, such as classification, link prediction, or regression. However, using Y directly essentially treats all motifs equally while it is known that some motifs are more important than others and the specific set of important motifs widely depends on the underlying graph structure. Therefore, by learning node embeddings from Y, the important structure in the data pertaining to certain motifs is automatically captured, which avoids having to specify the important motifs for a particular graph by hand (e.g., by a user).

Given Y from the above EQ16, a global higher-order network embedding can be determined by solving the following EQ17:

$$\underset{Z, H \in C}{\arg\min} \, \mathbb{D}(Y \| \Phi \langle ZH \rangle)$$

where Z is a N×D matrix of higher-order network embeddings and H is a D×TKD$_l$ matrix of the latent k-step motif embeddings. Each row of Z is a d-dimensional embedding of a node. Similarly, each column of H is an embedding of a latent k-step motif feature (i.e., column of Y) in the same d-dimensional space. Regularization terms may also be added to both this objective function and to the local objective function. The above EQ17 uses Frobenius norm which leads to the minimization problem as in the following EQ18:

$$\underset{Z, H}{\arg\min} \, \frac{1}{2} \| Y - ZH \|_F^2 = \frac{1}{2} \sum_{ij} (Y_{ij} - (ZH)_{ij})^2$$

where a similar minimization problem using Frobenius norm is solved for EQ13 above.

Attribute Diffusion may be optionally used, allowing the user to leverage any attributes and/or features that come with a graph. Attributes can also be diffused and incorporated into the higher-order network embeddings. One approach is to use the motif transition probability matrix as follows in EQ19:

$$\overline{X}_t^{(0)} \leftarrow X, \, P_t = D_t^{-1} W_t$$

$$\overline{X}_t^{(k)} = P_t \overline{X}_t^{(k-1)}, \text{ for } k=1,2,\ldots,K$$

where X is an N×F attribute matrix and $\overline{X}_t^{(k)} \in \mathbb{R}^{N \times F}$ is the diffused feature matrix after k-steps. Here $P_t$ can be replaced by any of the previous motif-based matrices derived from any motif matrix formulation as described above for the motif matrix functions. More generally, linear attribute diffusion is defined for HONE as in the following EQ20:

$$\overline{X}_t^{(0)} \leftarrow X$$

$$\overline{X}_t^{(k)} = \Psi(W_t^{(k)}) \overline{X}_t^{(k-1)}, \text{ for } k=1,2,\ldots,K$$

More complex attribute diffusion processes can also be formulated, such as the normalized motif Laplacian attribute diffusion defined as in the following EQ21:

$$\overline{X}^{(k)} = (1-\theta) L \overline{X}^{(k-1)} + \theta X, \text{ for } k=1,2,\ldots$$

where L is the normalized motif Laplacian as in the following EQ22:

$$L = I - D^{1/2} W D^{1/2}$$

The resulting diffused attribute vectors $\overline{X} = [\overline{X}_1 \, \overline{X}_2 \ldots]$ are effectively smoothed by the attributes of related nodes governed by the particular diffusion process. Afterwards, the diffused attribute vectors $\overline{X} = [\overline{X}_1 \, \overline{X}_2 \ldots]$ are incorporated into the node embeddings given as output in above EQ17 by replacing Y in EQ16 with the following EQ23:

$$Y = [\underbrace{U_1^{(1)} \ldots U_T^{(1)}}_{1-step} \ldots \underbrace{U_1^{(K)} \ldots U_T^{(K)}}_{K-steps} \overline{X}]$$

Alternatively, the $\overline{X}$ to Z, [Z $\overline{X}$] can be concatenated, and the columns of $\overline{X}$ are normalized using above EQ15 with the same norm as before.

Analysis: The described techniques for higher-order network embedding can utilize any state-of-the-art method to solve the objective functions, or compute the motifs, etc. Define ρ(A) as the density of A, and W denotes an arbitrary k-vertex motif adjacency matrix where k>2, then ρ(A)≥ρ(W). This is straightforward to see as the motif adjacency matrix constructed from the edge frequency of any motif H with more than k>2 nodes can be viewed as an additional constraint over the initial adjacency matrix A. Therefore, in the extreme case, if every edge contains at least one occurrence of motif H then ρ(A)=ρ(W). However, if there exists at least one edge that does not contain an instance of H then ρ(A)>ρ(W). Therefore, ρ(A)≥ρ(W).

Time Complexity: For time complexity, M=|E|, N=|V|, Δ=the maximum degree, T=the number of motifs, K=the number of steps, D$_l$=a number of dimensions for each local motif embedding (section "Local K-step Motif-based Embeddings" above), and D=dimensionality of the final node embeddings (section "Learning Global Higher-Order Embeddings" above). The total time complexity of HONE is as in the following EQ24:

$$\overline{O}(M(\Delta_{ub} + KTD_l) + NDKTD_l)$$

The time complexity of each step is provided. For the specific HONE embedding model, assume $\mathbb{D}$ is squared loss, Φ is the identity link function, and no hard constraints are imposed on the objective function in EQ13 and EQ17.

Weighted motif graphs: To derive the network motif frequencies, accurate estimation methods are used to achieve estimates within a guaranteed level of accuracy and time by setting a few simple parameters in the estimation algorithm. The time complexity to estimate the frequency of all network motifs up to size four (4) is O(MΔ$_{ub}$) in the worst case where Δ$_{ub}$ is a small constant. Hence, Δ$_{ub}$ represents the maximum sampled degree and can be set by the user.

After obtaining the frequencies of the network motifs, a sparse weighted motif adjacency matrix for each of the network motifs can be derived. The time complexity for each weighted motif adjacency matrix is at most $\overline{O}(M)$ and this is repeated T times for a total time complexity of $\overline{O}(MT)$ where T is a small constant. This gives a total time complexity of $\overline{O}(M(T + \Delta_{ub}))$ for this step and is thus linear in the number of edges.

Motif matrix functions: The time complexity of all motif matrix functions Ψ is $\overline{O}(M)$, and since Ψ(W$_t$) for t=1, . . . , T, the total time complexity is O(MT) in the worst case. Based on EQ24 above, M≥M$_t$, ∀$_t$ where M$_t$=nnz(W$_t$) and thus the actual time is likely to be much smaller, particularly given the rarity of some network motifs in sparse networks, such as 4-cliques and 4-cycles.

Embedding each k-step motif graph: For a single weighted motif-based matrix, the time complexity per iteration of cyclic/block coordinate descent and stochastic gradient descent is at most $\overline{O}(MD_l)$ where $D_l \ll M$. As noted in the section "Local K-step Motif-based Embeddings" above, explicitly computing and storing the k-step motif-based matrices is avoided by defining a linear operator corresponding to the K-step motif-based matrices with a time complexity that is at most K times the linear operator corresponding to the 1-step motif-based matrix. Therefore, the total time complexity for learning node embeddings for all k-step motif-based matrices is as in the following EQ25:

$$O\left(\underbrace{TMD_{l'}}_{k=1} + \underbrace{2(TMD_{l'})}_{k=2} + \ldots + \underbrace{K(TMD_{l'})}_{k=K}\right) = O(KTMD_{l'})$$

Global higher-order network embeddings: Afterwards, all k-step motif embedding matrices are horizontally concatenated to obtain Y (EQ16 above). Each node embedding matrix is $N \times D_l$ and there are $K \cdot T$ of them. Thus, it takes $\overline{O}$ $(NKTD_l)$ time to concatenate them to obtain Y. Noting that $N \gg KTD_l$ and therefore this step is linear in the number of nodes $N = |V|$. Furthermore, the time complexity for normalizing all columns of Y is $\overline{O}$ $(NKTD_l)$ for any normalization function g where each column of Y is a N-dimensional vector.

Given a dense tall-and-skinny matrix Y of size $N \times KTD_l$ where $N \gg KTD_l$, the next step is to learn the higher-order network embedding matrix Z and the latent motif embedding matrix H. Noting that unlike the higher-order network embeddings above that were derived for each sparse motif-based matrix (for all K-steps and T motifs), the matrix Y is dense with $NKTD_l = nnz(Y)$. The time complexity per iteration of cyclic/block coordinate descent and stochastic gradient descent is $\overline{O}$ $(DNKTD_l)$ and therefore linear in the number of nodes.

Space Complexity: The total space complexity of HONE is as in the following EQ26:

$$\overline{O}(T(M+NKD_l)+D(N+TKD_l))$$

The weighted motif adjacency matrices $W_1, \ldots, W_T$ take at most $\overline{O}(MT)$ space. Similarly, the space complexity of the motif-based matrices derived from any motif matrix function $\Psi$ is at most $\overline{O}(MT)$, and the space required for some motif-based matrices where the motif being encoded is rare will be much less than $\overline{O}(MT)$. The space complexity of each k-step motif embedding is $\overline{O}(ND_l)$ and therefore it takes $\overline{O}(NTKD_l)$ space for all $k=1, \ldots, K$ and $t=1, \ldots, T$ embedding matrices. Storing the higher-order network embedding matrix Z takes $\overline{O}(ND)$ space and the k-step motif embedding matrix H is $\overline{O}(D \cdot TKD_l)$. Therefore, the total space complexity for Z and H is $\overline{O}(ND+DTKD_e) = \overline{O}(D(N+TKD_l))$.

Figure 2:
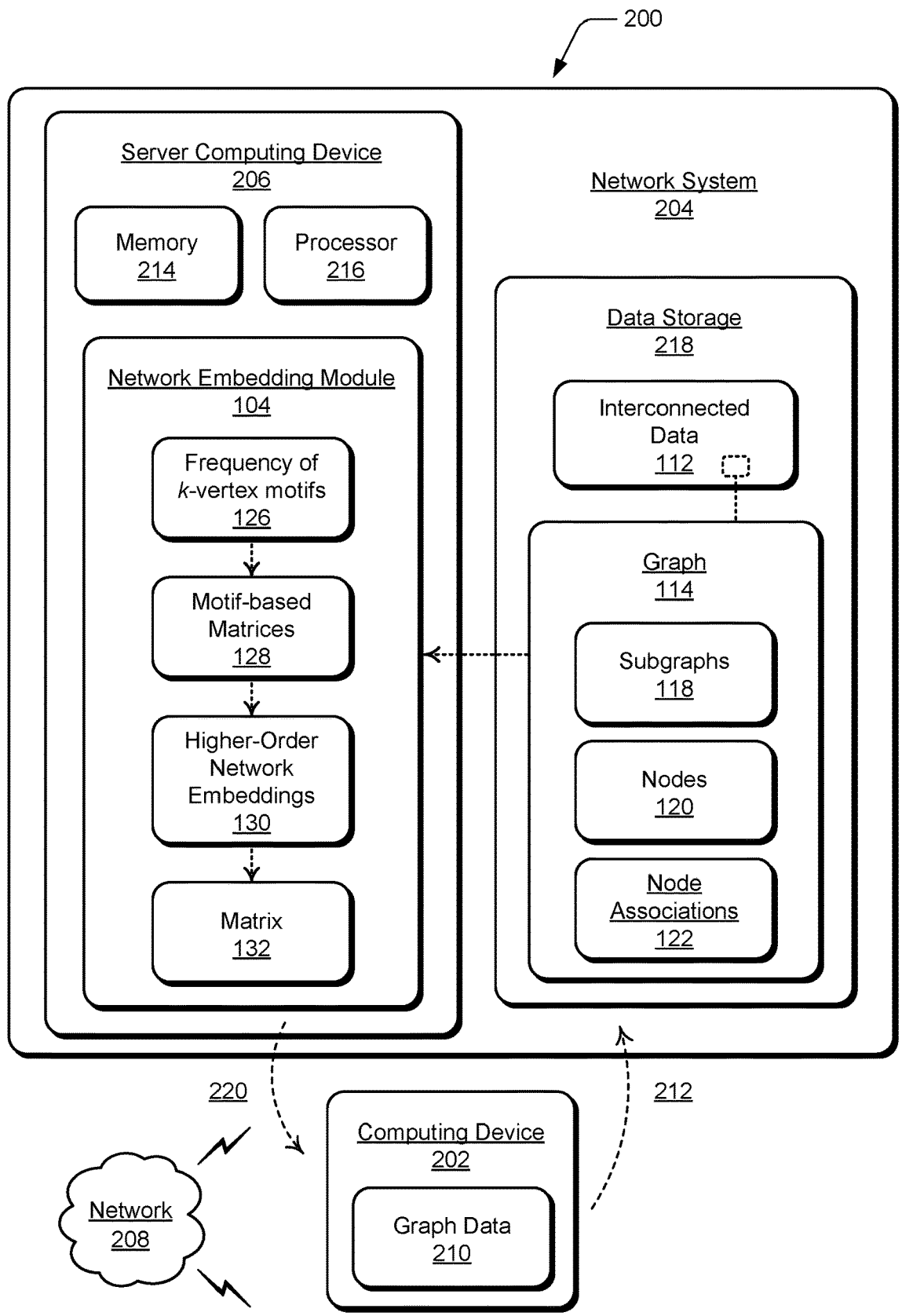
FIG. 2 illustrates another example environment in which aspects of higher-order network embedding can be implemented.

FIG. 2 illustrates another example environment 200 in which aspects of higher-order network embedding can be implemented. The example environment 200 includes a computing device 202 and a network system 204, which implements features of the network embedding module 104. The computing device 202 can be implemented as any type of computing device described herein, such as the computing device 102 shown and described with reference to FIG. 1. In this example environment 200, the computing device 202 may include any number and combination of different components as further described with reference to the example device shown in FIG. 6 and is implemented to access and communicate with a server computing device 206 of the network system 204, such as via a communication network 208.

A user of the computing device 202 may upload graph data 210 to the network system 204, where the graph data 210 may be the interconnected data 112, the graph 114, or any other type of graph data that represents a complex or dynamic network. The network system 204 can receive the uploaded graph data 210 as an input to the network embedding module 104 from the computing device 202, as indicated at 212 via the network 208.

Any of the devices, servers, and/or services described herein can communicate via the network 208, such as for data communication between the computing device 202 and the network system 204. The network 208 can be implemented to include a wired and/or a wireless network. The network can also be implemented using any type of network topology and/or communication protocol, and can be represented or otherwise implemented as a combination of two or more networks, to include IP-based networks and/or the Internet. The network 208 may also include mobile operator networks that are managed by a mobile network operator and/or other network operators, such as a communication service provider, mobile phone provider, and/or Internet service provider.

In this example environment 200, the network system 204 is representative of any number of cloud-based access sites that provide a service and/or from which data and information is available, such as via the Internet, for on-line and/or network-based access. The network system 204 can be accessed on-line, and includes the server computing device 206, which is representative of one or more hardware server devices (e.g., computing devices) that may be implemented at the network system. The server computing device 206 includes memory 214 and a processor 216, and may include any number and combination of different components as further described with reference to the example device shown in FIG. 6.

In this example environment 200, the server computing device 206 implements the network embedding module 104, such as in software, in hardware, or as a combination of software and hardware components, generally as shown and described with reference to FIG. 1. In this example, the network embedding module 104 is implemented as a software application or modules, such as executable software instructions (e.g., computer-executable instructions) that are executable with a processing system (e.g., the processor 216) of the server computing device 206 to implement the techniques of higher-order network embedding. The network embedding module 104 can be stored on computer-readable storage media, such as any suitable memory device (e.g., the device memory 214) or electronic data storage implemented in the server computing device 206 and/or at the network system 204.

The network system 204 may include multiple data storage, server devices, and applications, and can be implemented with various components as further described with reference to the example device shown in FIG. 6. The network system 204 also includes data storage 218 that may be implemented as any suitable memory, memory device, or electronic data storage for network-based data storage. The data storage 218 is utilized at the network system 204 to maintain the interconnected data 112 and/or the graph 114 that represents a network, as shown and described with reference to FIG. 1.

In aspects of higher-order network embedding, the network embedding module 104 can receive the graph data 210, as uploaded from the computing device 202, such as in the form of the graph 114. As shown and described with reference to FIG. 1, the network embedding module 104 is implemented to determine the frequency of k-vertex motifs 126 for each of the edges in the graph 114. In implementations, the network embedding module 104 is implemented to count the frequency of the k-vertex motifs 126 in the graph, which includes counting the frequency of each k-vertex motif, graphlet, or induced subgraph of interest (for k=2, . . . ) for every edge (i, j) in the graph. Notably, a node association between two nodes in the graph is an edge (e.g., a pair of nodes i and j) and the motifs, graphlets, or induced subgraphs that occur on every edge in the graph are counted. Further in general, any set of network motifs can be used, such as all k-vertex motifs, or all k-vertex motifs and (k−1)-vertex motifs, etc.

The network embedding module 104 is also implemented by the server computing device 206 to derive the motif-based matrices 128 from the frequency of each of the k-vertex motifs 126 in the graph 114. In implementations, the motif-based matrices 128 that are derived from the frequency of the k-vertex motifs 126 are weighted motif graphs. The network embedding module 104 may also receive an input parameter that designates a number of steps used to derive the k-step motif-based matrices from the frequency of each of the k-vertex motifs 126.

The network embedding module 104 can then determine the higher-order network embedding 130 for each of the nodes 120 in the graph 114 from each of the motif-based matrices 128. The network embedding module 104 can then concatenate the higher-order network embeddings 130 into a matrix 132 representation. The network embedding module 104 may also be implemented to determine a joint higher-order network embedding from the matrix 132, where the joint higher-order network embedding represents subgraph patterns of the subgraphs 118 of the network. The higher-order network embeddings 130 and/or the matrix 132 can then be communicated as feedback from the network system 204 to the computing device 202, as indicated at 220 via the network 208. A user of the computing device 202 can then run algorithms with their own graph data 210 and the received higher-order network embeddings 130.

In aspects of the higher-order network embedding, the network embedding module 104 is implemented to determine the motif matrix function that represents the mapping of the nodes 120 to d-dimensional features represented by the higher-order network embeddings 130. The network embedding module 104 can determine a network representation from machine learning applied to the higher-order network embeddings as further shown and described with reference to FIG. 3. The higher-order network embeddings capture the notion of structural similarity by using higher-order connectivity patterns explicitly in the learning process. Notably, the framework of higher-order network embedding also provides for prediction in extremely sparse power-lawed data, and particularly for only a few observations, where the conventional techniques are unable to handle extremely sparse data.

In this example, the graph data 210 is uploaded to the network system 204 and transformed into the feature-based representations (e.g., the higher-order network embeddings 130) that reflect the structural properties in the graph 114, so that a data user can run any machine learning algorithms with the feature-based representations and build model representations of a complex or dynamic network. For instance, in recommendation systems with users who are associated to other entities (e.g., items, events, pages, groups, users, locations, restaurants, businesses, etc.) that are being recommended, the users (nodes) are linked (associated) to the entities, which can be modeled by the network embedding module 104, significantly improving prediction analytics.

For example, the graph data 210 may represent a correlation of user devices, their location (spatial information), the time of an associated event, IP, webpages visited, among other important characteristics. The data can be represented as a rich heterogeneous network where users connect to other users, users connect to webpages, geographical location, etc. A notable machine learning task is to be able to predict which devices belong to the same user, and associate those devices, which can significantly improve any downstream prediction tasks using the data. For instance, using higher-order network embedding to make these associations between devices improves the ability to accurately model user behavior, knowing which multiple devices belong to the same user, and to make recommendations and predict user-level actions, such as clicks on a webpage or advertisement. Additionally, for webpage analytics where web pages can be represented as graphs, the nodes are the web pages and the edges (e.g., node associations) are the hyperlinks between the we pages.

The network embedding module 104 can determine the roles of the webpages and the relationships between the webpages, which provides a new insight into webpage analytics. Similarly, for the graph data 210 and analytics applications that leverage the data, the network embedding module 104 can utilize a device graph of user devices, and the higher-order network embeddings 130 can be used to model the roles of individual devices associated with users, as well as to determine the tasks performed by the devices. Segmenting the devices into group "roles" based on the determined user behavior, as represented in the graph, can also be used by various analytic applications. Further, aspects of higher-order network embedding can be used as a central component of a recommendation system, and the feature-based representations learned from higher-order network embedding can be directly used to make better recommendations, such as in photo applications, for user interests, and any other type of recommendations.

Figure 3:
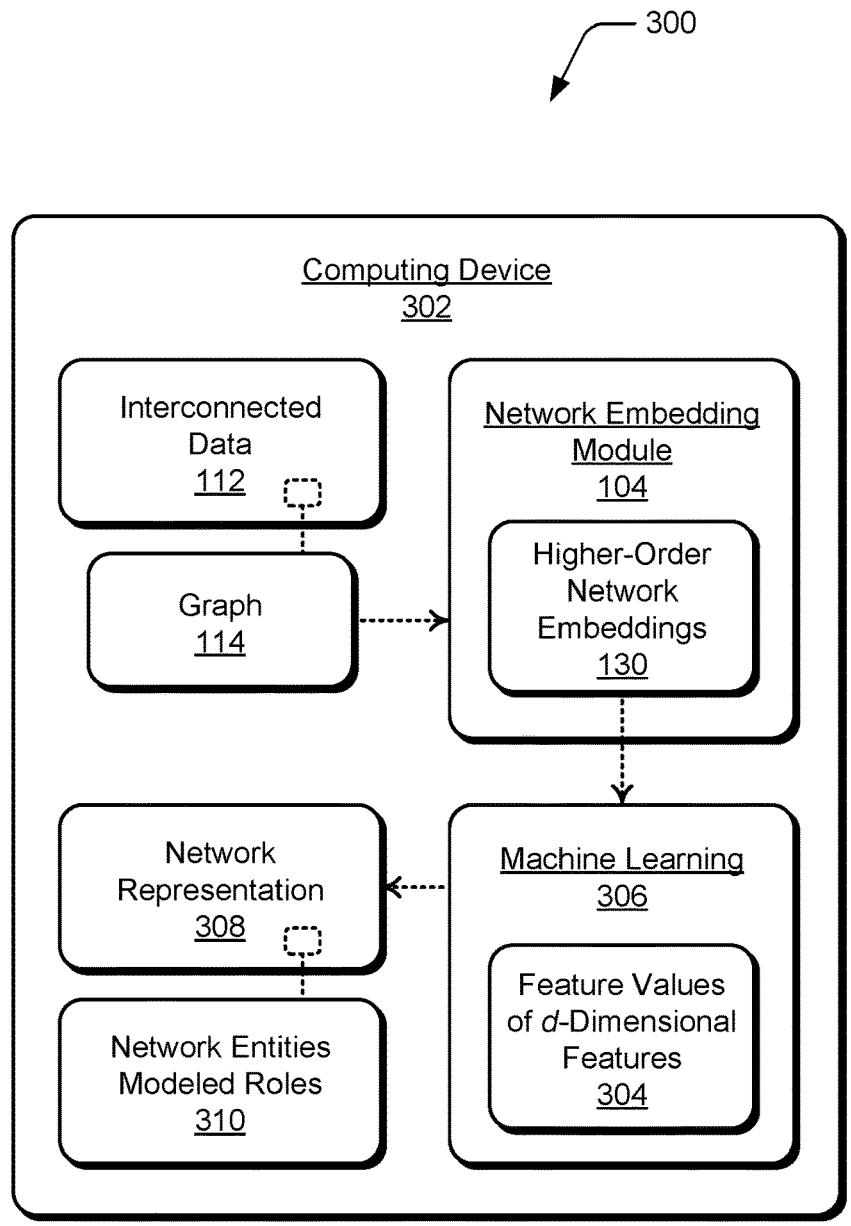
FIG. 3 illustrates another example environment in which aspects of higher-order network embedding can be implemented.

FIG. 3 illustrates an example environment 300 in which aspects of higher-order network embedding can be implemented. The example environment 300 includes a computing device 302, which implements features of the network embedding module 104 as shown and described with reference to FIGS. 1 and 2. The computing device 302 can be implemented as any type of computing device described herein, such as the computing device 102 (FIG. 1) or the server computing device 206 (FIG. 2). In this example environment 300, the computing device 302 may include any number and combination of different components as further described with reference to the example device shown in FIG. 6, and as noted above, may be implemented to access and communicate with the server computing device 206 of the network system 204, such as via the communication network 208.

As described above, the network embedding module 104 is implemented by the computing device 302 to determine the higher-order network embeddings 130 for the nodes 120 traversed in the graph 114. The higher-order network embeddings 130 for each of the respective nodes 120 are representative of feature values 304 that describe the respective graph nodes. For example, the graph 114 represents a network, and the feature values 304 are of d-dimensional features to which machine learning 306 can be applied to determine a network representation 308 of the network. For example, the network representations 308 can be generated as a network model by the machine learning 306, which then uses the network model to determine modeled roles 310 of the network entities that are represented by the network nodes 120 of the graph 114. Generally, the higher-order network embeddings 130 are the features of the network nodes 120, and the network embedding module 104 is implemented to determine the higher-order network embedding 130 for each of the nodes 120 in the graph 114. The machine learning 306 can receive the higher-order network embeddings 130, as generated by the network embedding module 104 shown and described with reference to FIGS. 1 and 2.

In this example, the computing device 302 implements the machine learning 306, such as in software, in hardware, or as a combination of software and hardware components. The machine learning can be implemented as any type of a neural network or machine learning model, referring to a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, and the like. Thus, a machine-learning model makes high-level abstractions in data by generating data-driven predictions or decisions from the known input data.

Example methods 400 and 500 are described with reference to respective FIGS. 4 and 5 in accordance with one or more aspects of higher-order network embedding. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
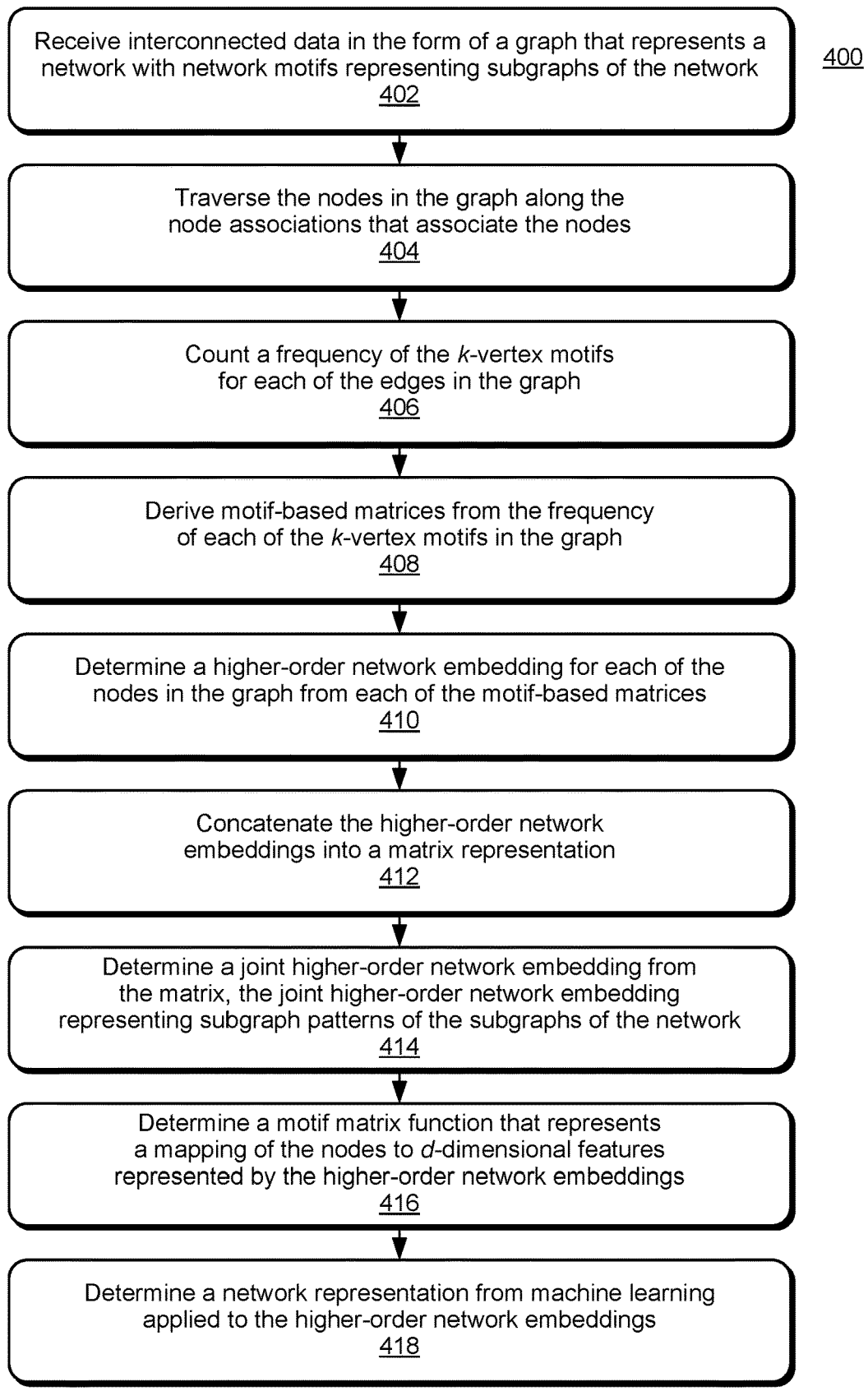
FIG. 4 illustrates an example method of higher-order network embedding in accordance with one or more implementations.

FIG. 4 illustrates example method(s) 400 for higher-order network embedding, and is generally described with reference to the network embedding module as shown and described with reference to FIGS. 1-3. The order in which the method is described is not intended to be construed as a limitation, and any number or combination of the method operations can be combined in any order to implement a method, or an alternate method.

At 402, interconnected data is received in the form of a graph that represents a network with network motifs representing subgraphs of the network, the graph including nodes that each represent an entity in the network and node associations that each represent an edge between two of the nodes in the graph. For example, the network embedding module 104, as implemented by the computing device 102 and/or the server computing device 206, receives the interconnected data 112 in the form of the graph 114 that represents a network with network motifs 116 representing subgraphs of the network. The graph 114 includes the nodes 120 that each represent an entity in the network, and includes the node associations 122 that each represent an edge between two of the nodes 120 in the graph.

At 404, the nodes in the graph are traversed along the node associations that associate the nodes. For example, the network embedding module 104 traverses the nodes 120 in the graph 114 along the node associations 122 as the graph traversal 124. At 406, a frequency of the k-vertex motifs for each of the edges in the graph is counted. For example, the network embedding module 104 counts the frequency of the k-vertex motifs 126 for each of the edges in the graph 114. In implementations, this includes counting the frequency of each k-vertex motif, graphlet, or induced subgraph of interest (for k=2, . . . ) for every edge (i, j) in the graph. As noted above, a node association between two nodes in the graph is an edge (e.g., a pair of nodes i and j) and the motifs, graphlets, or induced subgraphs that occur on every edge in the graph are counted.

At 408, motif-based matrices are derived from the frequency of each of the k-vertex motifs in the graph. For example, the network embedding module 104 derives the motif-based matrices 128 from the frequency of each of the k-vertex motifs 126 in the graph 114. In implementations, the motif-based matrices 128 that are derived from the frequency of the k-vertex motifs 126 are weighted motif graphs. Additionally, the motif-based matrices 128 may be derived by the network embedding module 104 using a k-step linear operator for linear attribute diffusion without explicit construction of the motif-based matrices. Alternatively, the motif-based matrices 128 may be derived using normalized motif Laplacian attribute diffusion to diffuse attributes that are incorporated into the higher-order network embeddings 130.

At 410, a higher-order network embedding for each of the nodes in the graph are determined from each of the motif-based matrices. For example, the network embedding module 104 determines the higher-order network embedding 130 for each of the nodes 120 in the graph 114 from each of the motif-based matrices 128. At 412, the higher-order network embeddings are concatenated into a matrix representation. For example, the network embedding module 104 concatenates the higher-order network embeddings 130 into a matrix 132 representation.

At 414, a joint higher-order network embedding is determined from the matrix, where the joint higher-order network embedding represents subgraph patterns of the subgraphs of the network. For example, the network embedding module 104 determines a joint higher-order network embedding from the matrix 132, where the joint higher-order network embedding represents subgraph patterns of the subgraphs 118 of the network.

At 416, a motif matrix function is determined that represents a mapping of the nodes to d-dimensional features represented by the higher-order network embeddings. For example, the network embedding module 104 determines a motif matrix function that represents a mapping of the nodes 120 to d-dimensional features represented by the higher-order network embeddings 130, and from which weighted motif graphs can derived from the motif matrix function. At 418, a network representation is determined from machine learning applied to the higher-order network embeddings. For example, the network embedding module 104 determines a network representation 308 from machine learning 306 applied to the higher-order network embeddings 130. Determining the network representation 308 can include generating a network model of the network based on the higher-order network embeddings 130 of the nodes 120 in the graph 114, where the network model is usable by a recommendation system, for example, to model roles of the entities in the network.

Figure 5:
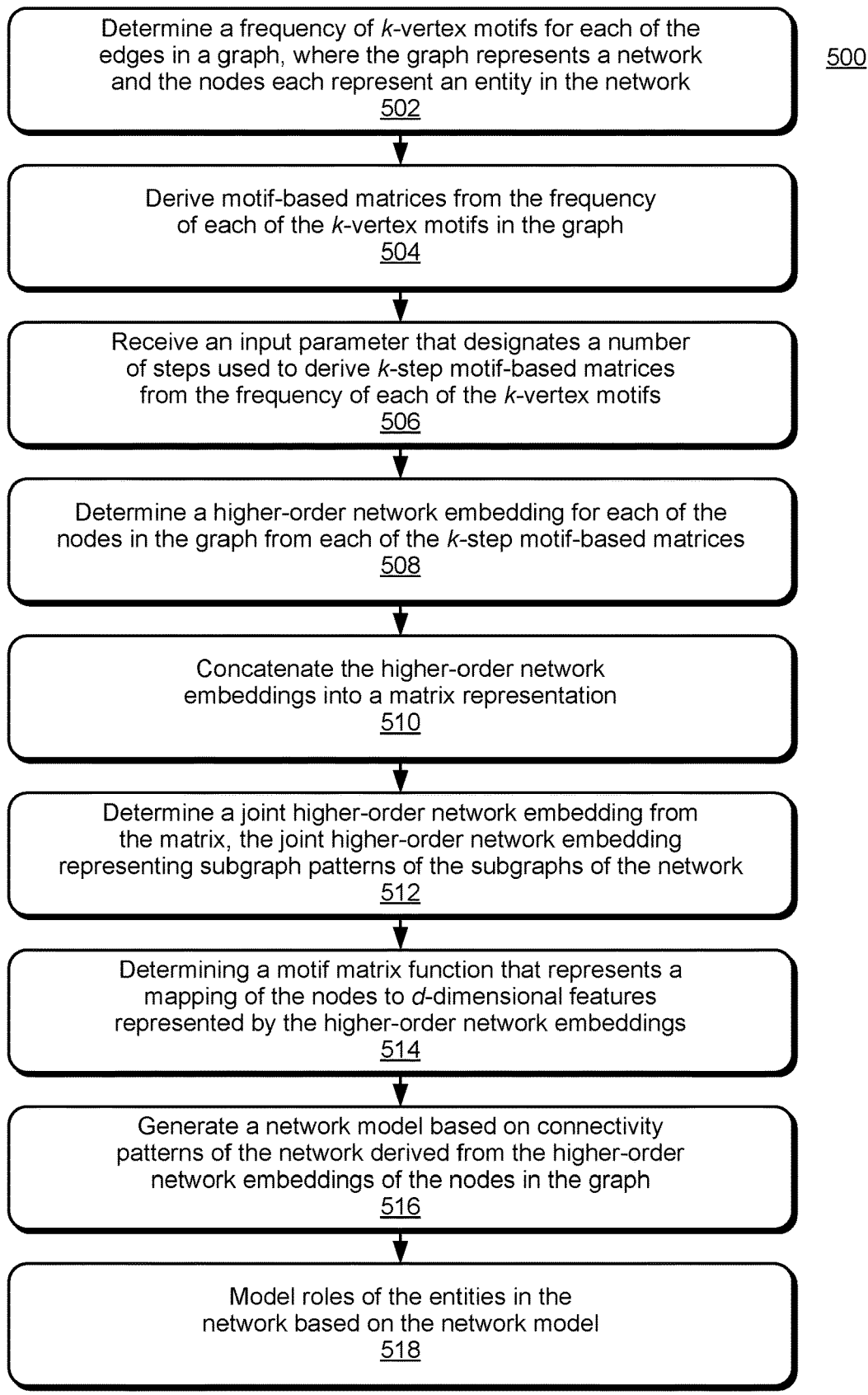
FIG. 5 illustrates an example method of higher-order network embedding in accordance with one or more implementations.

FIG. 5 illustrates example method(s) 500 for higher-order network embedding, and is generally described with reference to the network embedding module as shown and described with reference to FIGS. 1-3. The order in which the method is described is not intended to be construed as a limitation, and any number or combination of the method operations can be combined in any order to implement a method, or an alternate method.

At 502, a frequency of k-vertex motifs for each of the edges in a graph are determined, where the graph represents a network and the nodes each represent an entity in the network. For example, the network embedding module 104 counts the frequency of the k-vertex motifs 126 for each of the edges in the graph 114, where the graph 114 is a network and the nodes 120 each represent an entity in the network. In implementations, the frequency of each k-vertex motif, graphlet, or induced subgraph of interest (for k=2, ... ) is counted for every edge (i, j) in the graph. As noted above, a node association between two nodes in the graph is an edge (e.g., a pair of nodes i and j) and the motifs, graphlets, or induced subgraphs that occur on every edge in the graph are counted.

At 504, motif-based matrices are derived from the frequency of each of the k-vertex motifs in the graph. For example, the network embedding module 104 derives the motif-based matrices 128 from the frequency of each of the k-vertex motifs 126 in the graph 114. In implementations, the motif-based matrices 128 that are derived from the frequency of the k-vertex motifs 126 are weighted motif graphs. Additionally, the motif-based matrices 128 may be derived by the network embedding module 104 using a k-step linear operator for linear attribute diffusion without explicit construction of the motif-based matrices. Alternatively, the motif-based matrices 128 may be derived using normalized motif Laplacian attribute diffusion to diffuse attributes that are incorporated into the higher-order network embeddings 130.

At 506, an input parameter is received that designates a number of steps used to derive k-step motif-based matrices from the frequency of each of the k-vertex motifs. For example, the network embedding module 104 receives an input parameter that designates a number of steps used to derive the k-step motif-based matrices 128 from the frequency of each of the k-vertex motifs 126. At 508, a higher-order network embedding for each of the nodes in the graph are determined from each of the k-step motif-based matrices. For example, the network embedding module 104 determines the higher-order network embedding 130 for each of the nodes 120 in the graph 114 from each of the motif-based matrices 128.

At 510, the higher-order network embeddings are concatenated into a matrix representation. For example, the network embedding module 104 concatenates the higher-order network embeddings 130 into a matrix 132 representation. At 512, a joint higher-order network embedding is determined from the matrix, where the joint higher-order network embedding represents subgraph patterns of the subgraphs of the network. For example, the network embedding module 104 determines a joint higher-order network embedding from the matrix 132, where the joint higher-order network embedding represents subgraph patterns of the subgraphs 118 of the network.

At 514, a motif matrix function is determined that represents a mapping of the nodes to d-dimensional features represented by the higher-order network embeddings. For example, the network embedding module 104 determines a motif matrix function that represents a mapping of the nodes 120 to d-dimensional features represented by the higher-order network embeddings 130, and from which weighted motif graphs can derived from the motif matrix function.

At 516, a network model is generated based on connectivity patterns of the network derived from the higher-order network embeddings of the nodes in the graph. For example, the machine learning 306 generates a network model, such as the network representation 308, based on connectivity patterns of the network derived from the higher-order network embeddings 130 of the nodes 120 in the graph 114. At 518, roles of the entities in the network are modeled based on the network model. For example, the machine learning 306 models the roles 310 of the entities in the network based on the network representation 308. Notably, the machine learning 306 can model user behavior, or user devices associated with the users, which can then be utilized to make recommendations, predict user-level actions, recommend similar interests for a user, develop a device graph of user devices from which analytics can be leveraged for advertising, and any other type of behavior roles that may be modeled from a network representation.

Figure 6:
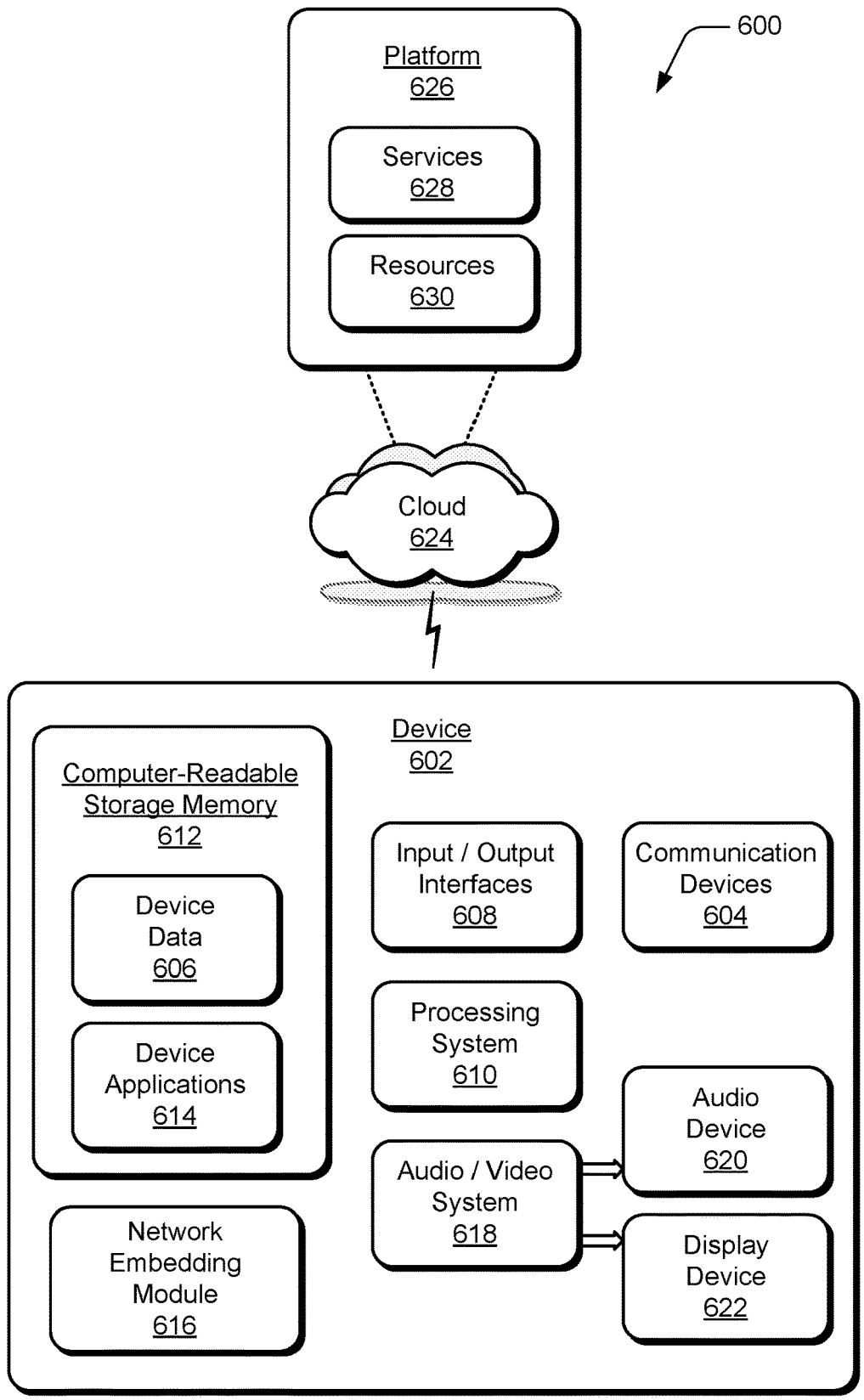
FIG. 6 illustrates an example system with an example device that can implement aspects of higher-order network embedding.

FIG. 6 illustrates an example system 600 that includes an example device 602, which can implement techniques of higher-order network embedding. The example device 602 can be implemented as any of the computing devices, mobile devices, server devices, and/or services described with reference to the previous FIGS. 1-5, such as any type of computing device, client device, mobile phone, tablet, communication, entertainment, gaming, media playback, and/or other type of device. For example, the computing device 102, the computing device 202, the computing device 302, the server computing device 206, and/or various server devices of the network system 204 may be implemented as the example device 602.

The example device 602 includes communication devices 604 that enable wired and/or wireless communication of device data 606, such as the interconnected data, the graph, the node data, the graph data, the higher-order network embeddings, the feature values, the network representation, as well as computer applications data and content that is transferred from one computing device to another, and/or synched between multiple computing devices. The device data 606 can include any type of audio, video, image, and/or graphic data that is generated by applications executing on the device. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The example device 602 also includes computer-readable storage memory 612, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 612 can include various implementations of random access memory (RAM), read-only memory (ROM), flash memory, and other types of storage memory in various memory device configurations.

The computer-readable storage memory 612 provides storage of the device data 606 and various device applications 614, such as an operating system that is maintained as a software application with the computer-readable storage memory and executed by the processing system 610. In this example, the device 602 includes a network embedding module 616 that implements the described techniques of higher-order network embedding, and may be implemented with hardware components and/or in software as one of the device applications 614, such as when the example device 602 is implemented as the computing device 102, the computing device 302, and/or the server computing device 206 shown in FIGS. 1-3. An example of the network embedding module 616 includes the network embedding module 104 that is implemented as a software application and/or as hardware components by the computing device 102, the computing device 302, the server computing device 206, and/or by other various server devices of the network system 204, as described with reference to FIGS. 1-5. In implementations, the network embedding module 616 may include independent processing, memory, and logic components as a computing and/or electronic device integrated with the device 602.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device. In embodiments, at least part of the techniques described for higher-order network embedding may be implemented in a distributed system, such as over a "cloud" 624 in a platform 626. The cloud 624 includes and/or is representative of the platform 626 for services 628 and/or resources 630. For example, the services 628 may include the network system 204 described with reference to FIGS. 1-5.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although implementations of higher-order network embedding have been described in language specific to features and/or methods, the appended claims are not necessarily limited to the specific features or methods described. Rather, the specific features and methods are disclosed as example implementations of higher-order network embedding, and other equivalent features and methods are intended to be within the scope of the appended claims. Further, various different examples are described and it is to be appreciated that each described example can be implemented independently or in connection with one or more other described examples.

The invention claimed is:

1. In a digital medium environment for higher-order network embedding, a method implemented by at least one computing device, the method comprising:
    receiving interconnected data in the form of a graph that represents a network, the graph including nodes that each represent an entity in the network and node associations that each represent an edge between two of the nodes in the graph;
    determining a frequency of k-vertex motifs for each of the edges in the graph;
    deriving motif-based matrices from the frequency of each of the k-vertex motifs in the graph;
    determining a higher-order network embedding for each of the nodes in the graph from each of the motif-based matrices; and
    generating a network model of the network based on the higher-order network embeddings of the nodes in the graph, the network model usable by a recommendation system to model roles of the entities in the network.

2. The method as recited in claim 1, further comprising concatenating the higher-order network embeddings into a matrix that represents dependencies and connectivity patterns among the nodes and the node associations.

3. The method as recited in claim 1, further comprising determining a motif matrix function that represents a mapping of the nodes to d-dimensional features represented by the higher-order network embeddings.

4. The method as recited in claim 3, further comprising deriving weighted motif graphs from the motif matrix function.

5. The method as recited in claim 1, wherein the motif-based matrices that are derived from the frequency of the k-vertex motifs are weighted motif graphs.

6. The method as recited in claim 1, further comprising determining a joint higher-order network embedding from the matrix, the joint higher-order network embedding representing subgraph patterns of subgraphs of the network.

7. The method as recited in claim 1, wherein the deriving the motif-based matrices comprises using a k-step linear operator for linear attribute diffusion without explicit construction of the motif-based matrices.

8. The method as recited in claim 1, further comprising determining a network representation from machine learning applied to the higher-order network embeddings.

9. A computing device implemented for higher-order network embedding in a digital medium environment, the computing device comprising:
   a memory to maintain interconnected data in the form of a graph that represents a network, the graph including nodes that each represent an entity in the network and node associations that each represent an edge between two of the nodes in the graph;
   a processor system configured to execute a network embedding module implemented to:
      determine a frequency of k-vertex motifs for each of the edges in the graph;
      derive motif-based matrices from the frequency of each of the k-vertex motifs in the graph;
      determine a higher-order network embedding for each of the nodes in the graph from each of the motif-based matrices;
      concatenate the higher-order network embeddings into a matrix representation; and
   the processor system configured to apply machine learning to model behavior roles of the entities in the network based on the matrix representation.

10. The computing device as recited in claim 9, wherein the network embedding module is implemented to determine the frequency of the k-vertex motifs by counting the frequency of the k-vertex motifs in the graph.

11. The computing device as recited in claim 9, wherein the network embedding module is implemented to determine a motif matrix function that represents a mapping of the nodes to d-dimensional features represented by the higher-order network embeddings.

12. The computing device as recited in claim 9, wherein the motif-based matrices that are derived from the frequency of the k-vertex motifs are weighted motif graphs.

13. The computing device as recited in claim 9, wherein the network embedding module is implemented to determine a joint higher-order network embedding from the matrix, the joint higher-order network embedding representing subgraph patterns of the subgraphs of the network.

14. The computing device as recited in claim 9, wherein the network embedding module is implemented to derive the motif-based matrices using a k-step linear operator for linear attribute diffusion to diffuse attributes that are incorporated into the higher-order network embeddings.

15. The computing device as recited in claim 9, wherein the network embedding module is implemented to determine a network representation from machine learning applied to the higher-order network embeddings.

16. In a digital medium environment for higher-order network embedding, a method implemented by at least one computing device, the method comprising:
   counting a frequency of k-vertex motifs in a graph that represents a network with nodes of the graph each representing an entity in the network;
   deriving motif-based matrices from the frequency of each of the k-vertex motifs in the graph;
   receiving an input parameter that designates a number of steps used to derive k-step motif-based matrices from the frequency of each of the k-vertex motifs;
   determining a higher-order network embedding for each of the nodes in the graph from each of the k-step motif-based matrices;
   generating a network model based on connectivity patterns of the network derived from the higher-order network embeddings of the nodes in the graph; and
   modeling roles of the entities in the network based on the network model.

17. The method as recited in claim 16, further comprising concatenating the higher-order network embeddings into a matrix that represents dependencies and the connectivity patterns among the nodes and the node associations.

18. The method as recited in claim 16, further comprising determining a motif matrix function that represents a mapping of the nodes to d-dimensional features represented by the higher-order network embeddings.

19. The method as recited in claim 16, further comprising determining a joint higher-order network embedding from the matrix, the joint higher-order network embedding representing subgraph patterns of subgraphs of the network.

20. The method as recited in claim 16, wherein the deriving the motif-based matrices comprises using normalized motif Laplacian attribute diffusion to diffuse attributes that are incorporated into the higher-order network embeddings.

* * * * *